United States Patent [19]

Powell et al.

[11] 4,124,179

[45] Nov. 7, 1978

[54] MOBILE HOME ANTIFREEZING SYSTEM

[76] Inventors: Kim Powell, 8472 King Rd.; Fred S. Sussex, 7923 South Cir., both of Parma, Mich. 49269

[21] Appl. No.: 760,105

[22] Filed: Jan. 17, 1977

[51] Int. Cl.² ............................................... F24D 5/10
[52] U.S. Cl. ......................................... 237/28; 165/45; 237/80
[58] Field of Search ................... 237/80, 28, 53, 16; 137/340; 126/101; 165/45; 138/32

[56] References Cited

U.S. PATENT DOCUMENTS

| | | | |
|---|---|---|---|
| 3,304,005 | 2/1967 | Lytle et al. | 237/80 |
| 3,689,037 | 9/1972 | Payne | 126/113 |
| 3,756,268 | 9/1973 | Lefever | 138/114 |

*Primary Examiner*—William E. Wayner
*Attorney, Agent, or Firm*—Beaman & Beaman

[57] ABSTRACT

An antifreezing system for an exterior water pipe servicing a mobile home wherein the mobile home includes a furnace having a forced hot air passage and a cold air return. The system utilizes a hot air closed circuit, thermally insulated, conduit system surrounding the exterior water pipe wherein one end of the conduit system communicates with the hot air passage, while the other end of the conduit system communicates with the cold air return. In this manner a flow of warm air through the conduit system is produced during furnace operation preventing freezing of the exterior pipes and conserving the energy required for antifreezing purposes.

7 Claims, 4 Drawing Figures

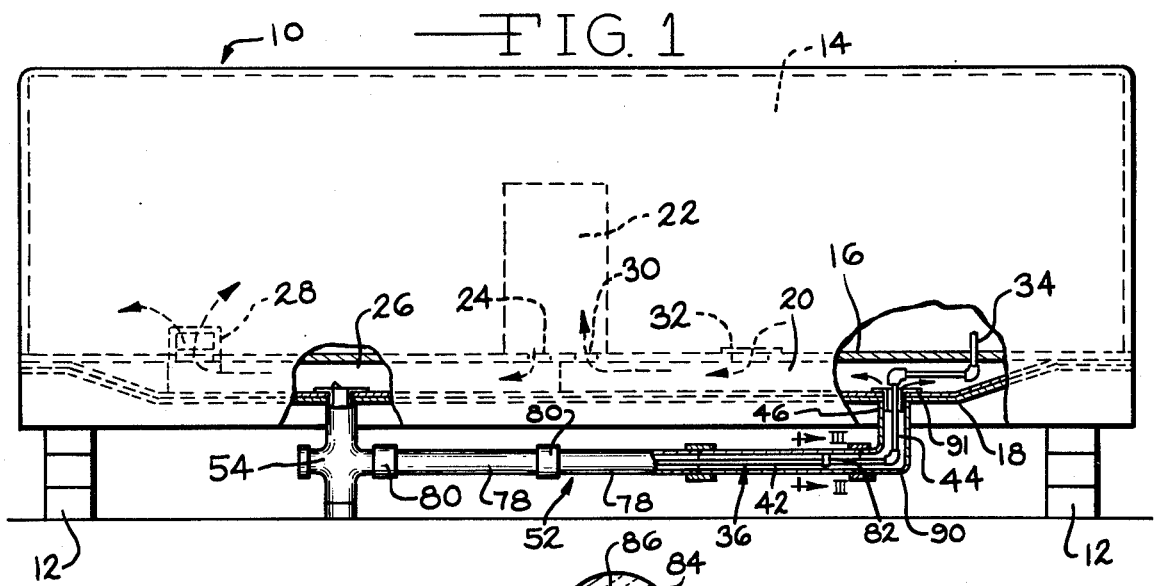
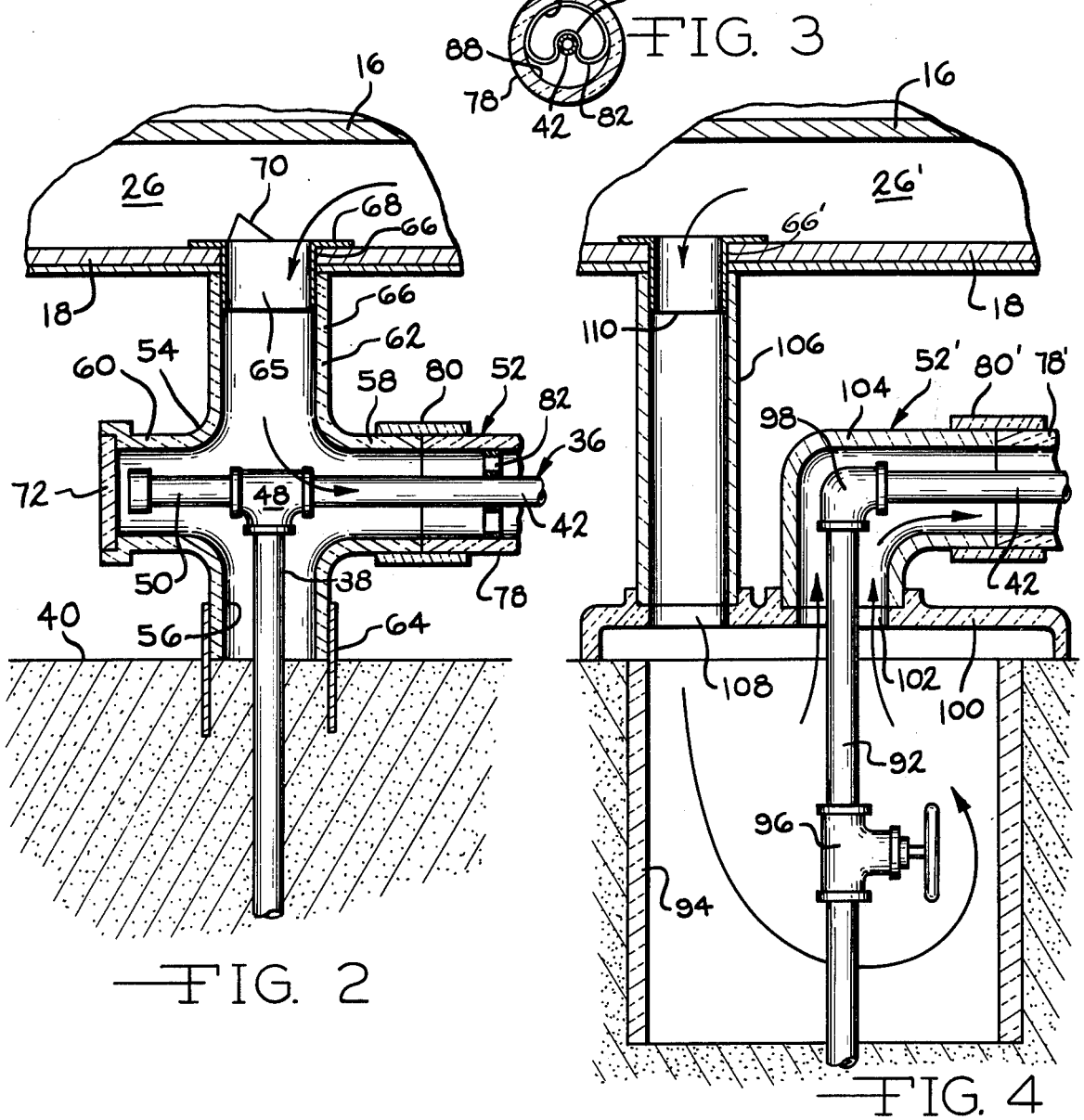

MOBILE HOME ANTIFREEZING SYSTEM

BACKGROUND OF THE INVENTION

The invention pertains to closed conduit systems utilized for the purpose of protecting an exterior water supply pipe for a heated dwelling from freezing.

In the most typical installation, the water service for mobile homes includes a vertical exterior service pipe rising from the ground adjacent the home, or from a pit disposed below or adjacent the home, which then travels horizontally to the location where the pipe enters the mobile home, usually through the floor. In northern climates, it is the common practice to insulate and heat the exterior water supply pipe of a mobile home water system to prevent freezing. Such protection consists of wrapping the exterior water pipe with an electrical heat tape of the resistance type and wrapping a thermal insulation, such as glass fibre, about the heat tape and pipe.

In such installations, the electric heat tape is energized during periods when freezing might occur, and it is the most common practice to leave the heat tape energized continually during cold weather. Such continuous use of electrical heat tapes of extended periods of time is relatively expensive, consumes substantial amounts of electrical energy, and most importantly, creates a safety hazard in that many mobile home fires are traced to faulty water pipe heat tapes. In particular, fires often occur at the location where the heat tape is disposed adjacent the mobile home floor or sub-floor where the exterior water pipe enters the home.

In U.S. Pat. No. 3,304,005 it is proposed to protect the exterior water pipe for mobile homes or trailers by encasing the pipes within a conduit system communicating with the forced hot air passage of the mobile home interior heating system. In the teaching of this patent a conduit system surrounds the exterior water pipe system and communicates with the home hot air passage to force hot air through the conduit system around the water pipe, and thereby prevent freezing. The hot air removed from the furnace passage is expelled into the atmosphere adjacent the water pipe region furtherest from the mobile home.

While the disclosure of U.S. Pat. No. 3,304,005 eliminates the necessity for heat tapes to prevent mobile home water systems from freezing it has the disadvantage of wasting heat energy since the heated air is expelled into the atmosphere, and is not recoverable. Further, as the hot air is expelled from the conduit system at the lowermost point of the system it is possible for dirt, leaves, and other foreign matter to accumulate about the conduit outlet ports, blocking such ports, and thereby preventing the necessary flow of heated air through the conduit system to avoid freezing.

In the practice of the present invention, deficiencies such as those mentioned above are overcome, and the advantages of the present invention are hereinafter described.

SUMMARY OF THE INVENTION

It is an object of the invention to provide an antifreezing system for mobile home exterior water systems wherein the heat produced by the home furnace is utilized to prevent pipe freezing, and hot air used to prevent such freezing is recycled through the mobile home interior furnace system.

A further object of the invention is to provide an antifreezing system for exterior water pipe systems which is automatic in operation, utilizes the pressure differential existing within the conventional home hot air heating system to insure a positive flow of heated air, is recycling in operation, efficient, and is not subject to blockage.

Yet another object of the invention is to provide an antifreezing water system for mobile home utilizing a thermally insulated conduit system surrounding the exterior water pipe wherein one end of the conduit system communicates with the forced hot air furnace passage, while the other end of the conduit system communicates with the furnace cold air return passage, and the thermal insulating nature of the conduit system material minimizes heat loss.

In the practice of the invention the mobile home with which the antifreezing system is utilized includes an exterior water pipe system servicing interior water pipes. The exterior water pipe may consist of a riser vertically extending from an underground piping system, or the riser may be within a pit below or adjacent the mobile home extending upwardly to the home. The pipe may then extend horizontally below the home to the desired point of entrance thereto. This entrance is usually into a sub-floor defined on the mobile home located several inches below the actual floor. The home interior heating system includes a hot air furnace having a forced hot air duct or passage often located within the sub-floor chamber, and the sub-floor chamber constitutes a cold air return for the furnace from which the furnace draws its supply of air to be heated by means of a power driven fan.

The exterior water pipe is encased within a thermally insulated conduit system, preferably consisting of styrofoam material, and the interior passage of the conduit system is several times greater in diameter than the exterior diameter of the water pipe wherein an air passage exists within the conduit system about the exterior pipe. One end of the conduit system communicates with the furnace hot air passage, while the other end of the conduit system communicates with the interior of the mobile home, preferably the furnace cold air return chamber whereby a significant pressure differential exists at the opposite ends of the conduit system. Thus, during furnace operation, warm air from the hot air passage is simultaneously forced and drawn into the conduit system, passes over the exterior pipe to prevent freezing, and is reintroduced into the furnace air cycle. The only heat energy loss is that absorbed by the conduit system or the exterior water pipe system, and this heat loss is relatively small.

The conduit system is of such configuration and mode of assembly as to be readily installed over existing exterior water pipe. The conduit system preferably includes a cross-shaped member providing access to specific portions of the exterior pipe, and the conduit system is of such versatility as to permit the system to be installed as desired to accommodate the particular location of the exterior water supply and the location of the furnace hot air and return air passages.

Preferably, the mobile home sub-floor chamber constitutes the furnace return air passage, and the end of the conduit system communicating with the return air passage communicates with the sub-floor at the point where the exterior pipe enters the housing sub-floor. In this manner the exterior pipe is not exposed to exterior temperatures at any location since it is encased within the conduit system from the point that the exterior pipe riser extends from the ground to the point that it enters the mobile home. Further, to insure an equal flow of hot air about the external pipe, spacers within the conduit system mounted upon the pipe maintain the conduit sections substantially concentric to the water pipe to permit a full flow of air about the water pipe.

BRIEF DESCRIPTION OF THE DRAWINGS

The forementioned objects and advantages of the invention will be apparent from the following description and accompanying drawings wherein:

FIG. 1 is an elevational view, partially in section, illustrating the environment in which the anti-freeze system of the invention is used, schematically illustrated, FIG. 2 is an enlarged, sectional, elevational view of one embodiment of the invention illustrating the conduit system adjacent one type of riser installation, FIG. 3 is an enlarged, elevational, sectional view illustrating a conduit system spacer as taken along Section 3—3 FIG. 1, and FIG. 4 is an elevational, sectional, enlarged, detailed view of another embodiment of anti-freezing conduit system in accord with the invention wherein the riser is located within a covered pit.

DESCRIPTION OF THE PREFERRED EMBODIMENTS

With reference to FIG. 1, a mobile home is shown at 10, and may be supported on wheels, not shown, or blocks 12. The mobile home defines a dwelling space 14 having an internal floor 16, and spaced below the floor is a sub-floor 18 which is enclosed to define a chamber 20 below the floor 16. The mobile home space 14 is heated by a forced hot air furnace 22 which is of the counterflow type wherein the hot air outlet 24 is disposed downwardly into a hot air duct or passage 26 located within the sub-floor chamber 20. For purpose of illustration, the hot air passage 26 is simplified in configuration, and shown only extending from the left of the furnace and includes a register 28 within space 14. In actual practice, the passage 26 will extend in both directions from the furnace whereby the entire interior space 14 of the mobile home may be readily heated.

The cold air return inlet 30 for the furnace 22 is located in the floor 16 communicating with the sub-floor chamber 20 whereby the cold air return required by the furnace is drawn from the mobile home space 14 through cold air registers 32 formed in the floor 16 communicating with the sub-floor chamber. During furnace operation a negative air pressure will exist within the sub-floor chamber 20, and a positive air pressure will exist within the hot air passage 26. Of course, within the sub-floor chamber 20 there is no direct communication between the hot air passage 26, which is usually defined by sheet metal ducts, and the chamber 20.

The mobile home includes a water supply system having an interior pipe 34 which supplies the water heater, sinks, toilets and other water utilizing fixtures, not shown. Interior pipe 34 is supplied by an exterior pipe system 36 which includes a riser 38, FIG. 2, extending vertically from the ground surface 40 from an underground main or well, a horizontal run 42 and a vertically extending riser 44 which extends into the sub-floor chamber 20 through an opening 46 defined in the sub-floor 18. The riser tee 48 may include a capped exterior hose connection nipple 50 whereby a garden hose fitting or the like may be attached to the exterior water supply during warm weather.

The thermally insulated conduit system which encompasses the exterior water pipe system 36 is generally indicated at 52, and this conduit system is of an elongated configuration having one end thereof communicating with the furnace hot air passage 26, and the other end thereof communicating with the furnace cold air return chamber 20 wherein a pressure differential exists at opposite ends of the conduit system during furnace operation.

With reference to FIG. 2, the conduit system 52 at the riser 38 includes a cross-shaped member 54 formed of styrofoam material. The member 54 includes a downwardly extending neck 56, horizontally extending ports 58 and 60, and upwardly extending neck 62. The member 54 is installed by inserting a split sheet metal sleeve or collar 64 about the riser 38 into the ground surrounding the riser. The sleeve is inserted several inches into the ground below the ground surface 40, and is of such diameter as to snugly receive the neck 56. The member 54 is preferably split into two identical portions whereby the portions may be assembled about the riser 38, elbow 48 and pipe 42 and then taped together or otherwise clamped in assembled relationship whereby the ports 58 and 60 and necks 56 and 62 define cylindrical configurations.

The neck 62 communicates with the hot air passage 26 within subfloor chamber by means of a sheet metal sleeve 65 inserted within the opening 66 defined in the subfloor 18. The sheet metal sleeve includes tabs 68 bent over to retain the sleeve in opening 66 and may also include an adjustable deflector 70 which aids in deflecting hot air into the neck 62, although the use of the deflector is optional. The sleeve 65 provides an air-tight connection between the neck 62 and the hot air passage 26 whereby hot air is readily introduced into the insulated member 54 as indicated by the arrows, FIG. 2.

The port 60 is employed to provide access to the nipple 50, and includes a removable plug 72 which may also be formed of styrofoam and may be removed from the port 60 during warm weather to provide access to the nipple and permit a hose extension fitting to be attached thereto.

The external pipe horizontal run 42 extends centrally through the port 58, and the horizontal portion 42 is encompassed throughout its length by a plurality of cylindrical styrofoam sections 78 maintained in abutted end-to-end relationship by collars 80. The sections 78, and the collars 80, will usually be longitudinally split so as to be slipped over the pipe run 42, and tape is preferably employed to hold the sections and collars in their cylindrical configurations once properly assembled. Of course, if a union exists in the exterior pipe run 42, the union may be disconnected and thermal conduit sections slipped thereover without slitting, although this mode of installation is rather troublesome.

In order to assure an adequate flow of air about the exterior pipe run 42 a plurality of spacers 82 are located within the conduit system and consist of a plurality of bow-shaped elements having a partial inner circular configuration 84 permitting the spacer to be snapped over the pipe 42, and a partial outer configuration 86 of a circular form which corresponds to and engages the inner surface 88 of the sections 78 for supporting the sections concentric to the pipe. The spacers 82 may be formed of resilient metal or plastic, and are stiff enough to adequately support the conduit sections, but flexible enough to permit being snapped upon the pipe portion 42.

As will be noted in FIG. 1, the conduit system 52 includes an elbow 90 which encompasses the vertical pipe riser portion 44, and the elbow 90 communicates with the opening 46 defined in the mobile home subfloor by means of a sheet metal sleeve 91 similar to sleeve 65, without a deflector, to establish a relatively airtight connection between the conduit system 52 and the mobile home subfloor chamber 20.

It will, therefore, be appreciated that the entire exterior water pipe system 36 is encased within the thermally insulated styrofoam elements of the conduit system 52 and, during furnace operation, the differential air pressure existing within the hot air passage 26 and the cold air return subfloor chamber 20 will provide a significant flow of warm air over the exterior piping to prevent the same from freezing. As the only loss of heat occurring from the recycling air as it passes through the conduit system 52 is that lost through the walls of the styrofoam member, or into the water pipe, the heat loss is low and it is not possible for foreign matter to obstruct the air flow since the conduit system is closed.

FIG. 4 illustrates a variation in the configuration of components used in the thermally insulated conduit system to accommodate a water supply riser pipe 92 located within a pit 94 formed in the ground below or adjacent the mobile home. The riser 92 would usually include a shutoff valve 96 located within the pit, and an elbow 98 connects the riser to the horizontal pipe run 42', which is identical to the pipe run 42 previously described.

The insulated conduit system of FIG. 4 includes a thermally insulated cover 100 extending over the pit 94, and the cover includes an outlet opening 102 which receives the styrofoam elbow 104 for encompassing the pipe elbow 98 and establishing communication between the pit and conduit sections 78'.

Hot air is introduced into the pit 94 through a styrofoam conduit 106 communicating with the cover inlet opening 108 at its lower end, and communicating with the hot air passage 26' from the furnace, at its upper end. A sheet metal sleeve 110 may be employed to connect the upper end of the conduit 106 to the opening 66' formed in the hot air passage 26' which is similar to sleeve 64.

Operation of the embodiment of FIG. 4 is identical to that described previously in that hot air within the passage 26' will be forced and drawn into the conduit 106, pit 94, and into the elbow 104 and horizontal conduit system sections 78', as previously described. In the embodiment of FIG. 4, the end of the horizontal run portion 42' communicates with the trailer subfloor chamber 20 as explained with respect to FIG. 1 above.

In the embodiments of FIGS. 2 and 4, the exterior water pipe risers 38 and 92 have been illustrated as being located immediately below the hot air passage 26 or 26' and, thus, connection to hot air passage by the insulated conduits adjacent the riser is simplified. It is to be appreciated that there will be instances wherein the riser may not be located directly below a hot air passage or, in fact, may not be directly below the mobile home, but may be adjacent a side thereof. In those instances wherein the riser is not directly below the hot air passage appropriate thermally insulated conduit sections of cylindrical form, similar to sections 78, communicate with the neck 62, or conduit 106, and extend in such horizontal direction as to permit the same to be connected to a sleeve communicating with the nearest hot air passage.

It is also to be appreciated that it is possible to practice the inventive concept of the invention without direct communication of conduit system 52 with the cold air return passage of the furnace. For instance, the elbow 90 could communicate directly with the interior space 14 of the mobile home 10, and a differential pressure will still exist between the interior of the mobile home and the furnace hot air pressurized passage, and in those furnace installations wherein the cold air return directly communicates with the housing interior space, rather than a subfloor chamber, such installation is within the scope of the inventive concept.

It is to be appreciated that various modifications of the invention may be apparent to those skilled in the art without departing from the spirit and scope thereof.

We claim:

1. In combination, a mobile home having an internal heating system including a hot air furnace having a pressurized hot air passage and a cold air return passage, a water system serving said mobile home having internal pipes within said home and an external pipe exterior of said home, a thermally insulated conduit system located exteriorly of said mobile home having a first end communicating with one of said passages and a second end communicating with the other passage whereby heated air circulates through said conduit system during operation of said furnace, said external pipe being located within said conduit system for protection from freezing, said external pipe entering said mobile home through said cold air return passage, said conduit system end communicating with said cold air return passage being connected to said return passage at the location said external pipe enters said mobile home.

2. In combination, a mobile home having a floor and a subfloor defined below said floor forming a subfloor chamber, a forced hot air furnace within said mobile home having a pressurized hot air passage and having a subatmospheric pressure cold air return communicating with said subfloor chamber, a water supply pipe system including an exterior pipe located exteriorly of said mobile home and entering said mobile home through said subfloor chamber and an internal pipe extending into said subfloor chamber connected to said external pipe, a thermally insulated conduit system located exteriorly of said mobile home having a first end communicating with said hot air passage and a second end communicating with said subfloor chamber at the juncture of said exterior and internal pipes, whereby heated air circulates through said conduit system during operation of said furnace, said exterior water supply pipe being located within said conduit system for protection from freezing.

3. In combination, a water supply antifreezing system for mobile homes having an internal forced hot air heating system including a furnace, a hot air passage and a cold air return, and a water supply system including an internal pipe connected to an external pipe, a conduit system including a first thermally insulated conduit communicating with said hot air passage and a second thermally insulated conduit communicating with said first conduit and said cold air return whereby heated air flowing through said first conduit is drawn through said second conduit to said cold air return passage, said external pipe being within said conduit system whereby heated air passes thereover during furnace operation, said internal pipe extending through said cold air return at the juncture with said external pipe, said second conduit communicating with said cold air return at the juncture of said internal and external pipes.

4. In a water supply antifreezing system as in claim 3 wherein said external pipe includes a ground rise portion wherein said external pipe initially rises from the ground, said second conduit surrounding said external pipe substantially from said rise portion to the juncture with said internal pipe.

5. In a water supply antifreezing system as in claim 4 wherein said first conduit is of a cross shape configuration and surrounds said ground rise portion, said second conduit communicating with said cross shape configuration first conduit.

6. In a water supply antifreezing system as in claim 4, said ground rise portion extending from a ground pit, a cover extending over said pit, a hot air inlet opening defined in said cover, said first conduit communicating with said inlet, a hot air outlet defined in said cover, said ground rise portion extending through said outlet, said second conduit communicating with said outlet.

7. In a water supply antifreezing system as in claim 3, a subfloor chamber defined in said mobile home comprising said cold air return, said second conduit communicating with said subfloor chamber.

* * * * *